No. 749,046. PATENTED JAN. 5, 1904.
W. F. FOLMER & A. M. LAWRENCE.
STEREOSCOPE.
APPLICATION FILED MAY 2, 1903.
NO MODEL.
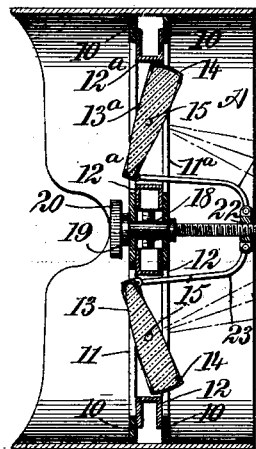
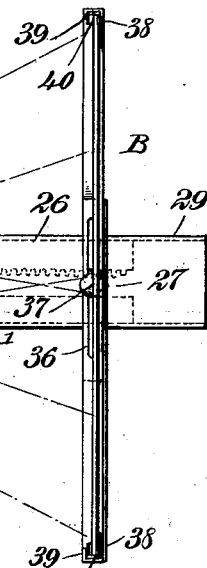
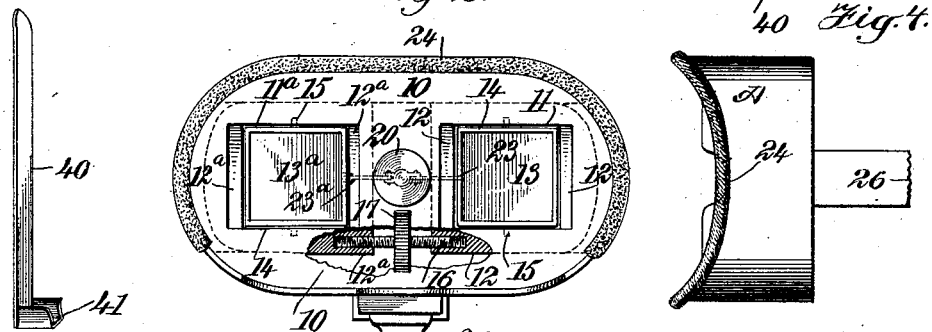
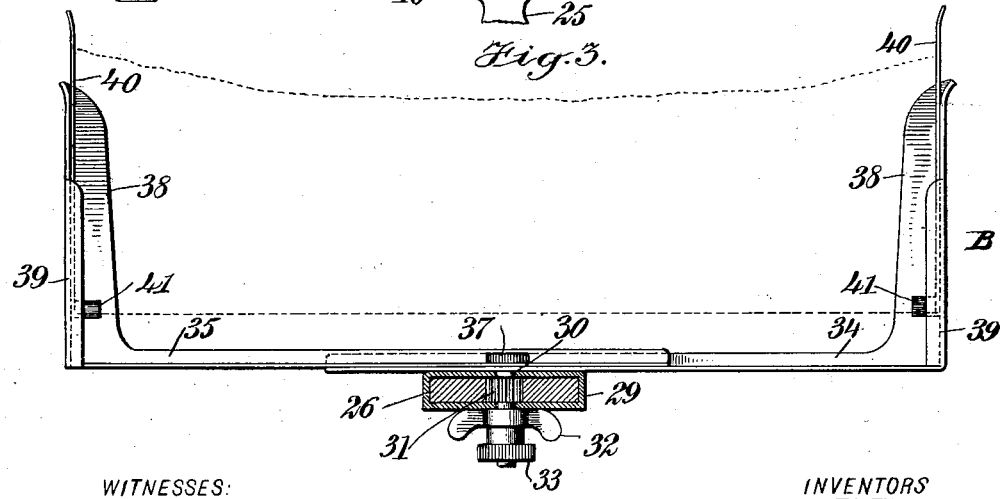
WITNESSES:
INVENTORS
William F. Folmer
Arthur M. Lawrence
BY
ATTORNEYS.

No. 749,046. Patented January 5, 1904.

UNITED STATES PATENT OFFICE.

WILLIAM F. FOLMER AND ARTHUR M. LAWRENCE, OF NEW YORK, N. Y.

STEREOSCOPE.

SPECIFICATION forming part of Letters Patent No. 749,046, dated January 5, 1904.

Application filed May 2, 1903. Serial No. 155,380. (No model.)

*To all whom it may concern:*

Be it known that we, WILLIAM F. FOLMER and ARTHUR M. LAWRENCE, citizens of the United States, and residents of the city of New York, borough of Manhattan, in the county and State of New York, have invented a new and Improved Stereoscope, of which the following is a full, clear, and exact description.

The purpose of our invention is to provide a stereoscope so constructed that a view, no matter of what character, taken with stereoscopic lenses may be placed in the instrument without the object being mechanically reversed, as is customary, and through adjustment of the lenses to optically reverse the object, whereby to obtain a proper stereoscopic effect.

A further object of the invention is to so construct the instrument that the lenses can be quickly, conveniently, and accurately adjusted with reference to the focal plane of any stereoscopic view and whereby the lenses are arranged for pupilary separation as required by the necessities of the observer.

Another purpose of the invention is to provide for the focal adjustment and the pupilary adjustment or separation of the eyes at the front of the optical hood or section of the instrument, the adjusting devices being within convenient reach, and to further provide the instrument with the customary focal adjustment relative to the carrier of the picture, the focal adjustment of the lenses being such that the instrument is adapted to serve with equally good results in viewing the ordinary stereoscopic picture as those pictures printed directly from a stereoscopic negative without transposition; but the prime object of the instrument is to permit the use of prints made direct from a stereoscopic negative, the stereoscopic rectification of the objects being made at the optical portion of the instrument by the adjustment of the lenses.

Another purpose of the invention is to provide means whereby the picture-holder is constructed for vertical and lateral adjustment, thus enabling any-sized stereoscopic view within reasonable dimensions to be adapted to the instrument, and also to so construct the hood that it may be absolutely fitted to the contour of the face, preventing light leaking into the hood while the object is being viewed.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a sectional plan view of the improved instrument. Fig. 2 is a front elevation of the instrument, parts being in section. Fig. 3 is a transverse section taken practically on the line 3 3 of Fig. 1, looking in direction of the arrows. Fig. 4 is a plan view of the hood of the instrument, and Fig. 5 is a detail perspective view of one of the vertically-adjustable holders for a picture to be viewed and which is adapted to be fitted in the carrier or main holder for the view.

A represents the optical hood of the instrument, which may be of any approved type. About centrally within this hood two partitions 10 are placed a suitable distance apart, and these partitions fit snugly to the inner wall of the hood, as is shown in Figs. 1 and 2. Openings 11 and $11^a$ are made in these partitions at each side of the center, corresponding openings in the partitions being in registry, and between these partitions 10 at the openings 11 and $11^a$ therein frames 12 and $12^a$ are mounted to slide horizontally or in direction of the side walls of the said hood. These frames 12 and $12^a$ may be of any desired character. Their bottom portions, however, are shown solid, as illustrated in Fig. 2, while their upper portions are of skeleton formation, as is indicated in Fig. 1. These frames 12 and $12^a$ are adapted to extend beyond the margins of the openings 11 and $11^a$ to such an extent that the frames 12 and $12^a$ may be laterally adjusted without entirely uncovering the openings 11 and $11^a$.

Each frame 12 and $12^a$ has pivoted therein a stereoscopic view-lens, the lens designated as 13 being centrally pivoted in the frame 12, and the lens designated as $13^a$ occupies a corresponding position in the frame $12^a$. These lenses are pivoted at their centers by suitable pins 15 at the top and bottom portions, entering, respectively, the upper and the lower portions of the said laterally-adjustable frames 12 and 12ª. Each stereoscopic view-lens 13 and 13ª is preferably provided with a marginal frame 14, as is shown in Figs. 1 and 2, so that the said lenses may have an adequate protection.

The frames 12 and 12ª, carrying the stereoscopic lenses 13 and 13ª, are adjusted laterally, preferably by the mechanism shown in Fig. 2, wherein it will be observed that threaded recesses are produced in the lower inner end portions of the frames, the thread of one recess being right-handed and the thread of the other recess left-handed, and these threaded recesses receive correspondingly-threaded ends of an adjusting-screw 16. This adjusting-screw is turned by means of a preferably centrally-located disk or wheel 17, having a milled or otherwise roughened peripheral edge. Thus it will be observed that the lenses may be separated or may be brought together, as may be necessitated by the pupilary conditions of the observer's eyes.

At the central portion of the partitions 10 a sleeve 18 is secured, and the plain portion of a screw 19 is passed through this sleeve, and this portion of the screw 19, as illustrated in Fig. 1, is provided with suitable collars whereby the screw may turn readily in the partitions 10, but cannot move from the position in which it is placed. This screw 19 at its forward end is provided with a knob 20, preferably milled or roughened, and by turning the said knob the screw 19 is also turned. The threaded portion 21 of the screw 19, which is that portion which is at the rear of the rearmost partition 10, is passed through a nut 22, and suitably-curved arms 23 and 23ª are employed to connect the said nut 22 respectively with the inner portion of the frame of the lenses 13 and 13ª, as is also best shown in Fig. 1.

A marginal cushion 24, of chenille or other soft material, is fitted in any approved manner to the front edge of the hood A, particularly at the top and side edges of the said hood, as is shown in Fig. 2, so that the hood can be conveniently and tightly fitted to the face of the observer, thereby excluding all unnecessary light at the front portion of the hood. The hood is shown provided with the usual hand stem or knob 25, secured to its bottom portion, and a main stem 26, as is usual in this class of instruments, is carried rearward a required distance from the bottom portion of the hood, as is shown in Fig. 1. This main or horizontal stem 26 is provided with a longitudinal central slot 27, extending from its rear end a predetermined distance in direction of the hood, and one or both side walls of this slot 27 is provided with rack-teeth 28. (Shown in dotted lines in Fig. 1.)

A casing 29 is adapted to slide loosely on the said main stem 26, extending from the hood, and this casing conforms in cross-sectional shape to the said stem 26 and preferably entirely surrounds the said stem, the casing being open at both of its ends. At or near the forward end of this casing 29 the trunnions 30 of a pinion 31 are mounted to turn, the pinion being adapted to mesh with the rack-teeth 28, and the lower trunnion from the pinion 31 extends below the sliding casing 29 and carries a lock-nut 32, adapted to hold the casing in its adjusted position and likewise the knob 33, whereby when the lock-nut 32 is loosened the pinion 31 may be turned to impart movement to the casing 29, which construction is best shown in Fig. 3.

A view-holder B is carried by the casing 29, being attached to the said casing at or near its rear end. This view-holder B is made in two sections 34 and 35, so that it may be lengthened or shortened, according to the size of the view, and the inner ends of the sections 34 and 35 of the holder are adapted to slide one on the other, and these inner ends of the said sections of the holder are provided with registering slots 36. (Shown in Fig. 1.) The sections of the holder are held in adjusted position by a set-screw 37, passed down through the slots 36 in the sections of the holder and through the slot 27 in the main stem 26. Preferably each section of the view-holder B consists of a lower member and a rear and a forward upwardly-extending member, the latter members being designated as 38 and 39, and the rear upright members 38 are usually made higher and are wider than the forward members 39. A space intervenes between the side members 38 and 39 of a section of the view-holder, and in each space a vertical arm 40 is mounted to slide. Each arm is provided at its lower end with a horizontal socket 41, preferably made of spring material, and the side walls of these sockets are flared outwardly, so as to engage with opposing faces of the side members 38 and 39 of the said view-holder B. The lower edge of the view is placed in the sockets 41, and the arms 40, carrying these sockets, are adjusted upwardly or downwardly, so as to bring the view in proper relation to the view-lenses 13 and 13ª.

From the description above given, and particularly by reference to Fig. 1 of the drawings, it will be observed that by the adjustment of the screw 19 the angularity of the view-lenses 13 and 13ª with reference to a line drawn centrally and longitudinally through the instrument may be changed at will and that by bringing the inner ends of the view-lenses forwardly the line of vision from the right-hand lens 13 will be on the radial lines $a$, $a'$, and $a^2$, ranging from the center of the view-holder to its left-hand edge, while the range of vision from the left-hand view-lens 13ª will cross the range of vision from the opposing lens, the lines of sight from the left-hand lens 13ª (designated as $b$, $b'$, and $b^2$) extending from the center of the view-holder B to the right-hand end of the same. Thus it will be seen that through the adjustment of the lenses the objects to be viewed and obtained from a stereoscopic lens are optically reversed and that views may be used which are taken direct from the negative.

In the event the ordinary stereoscopic views are to be used the view-lenses 13 and 13ª are adjusted so as to occupy the position which such lenses have in an ordinary stereoscope.

It is furthermore observed that we have made provision for almost every condition that may arise in the use of an instrument of the character described, as we have provided not only for the adjustment of the lenses so as to properly focus the objects and optically and automatically transpose them, but we have also provided for an adjustment of the lenses which will adapt an instrument to the peculiar pupilary conditions of all users.

Having thus described our invention, we claim as new and desire to secure by Letters Patent—

1. In a stereoscope or similar instrument, a hood, lenses independently, axially and slidably mounted in openings in the hood, and independent adjusting devices for the lenses, both adjusting devices being connected with both lenses to simultaneously operate the same, one adjusting device acting to move the lenses upon their pivots and the other adjusting device to move the lenses to and from each other, for the purposes set forth.

2. In a stereoscope or similar instrument, a hood, and mounts pivoted in openings in the hood, lenses secured within the mounts, an adjusting device between the mounts, and connections between the adjusting device and the inner edges of the mounts of the lenses, whereby to simultaneously swing the lenses upon their pivots, as described.

3. In a stereoscope or similar instrument, a hood and a view-holder, view-lenses centrally pivoted in the hood, from which the line of sight crosses between the lenses and the holder, whereby to optically rectify a view taken by the stereoscope-lenses and printed direct from the negative, an adjusting device between the lenses and pivotally connected with the inner edge of each lens, whereby to correct the lenses with reference to their angularity of focal plane, mounts adapted to slide laterally in the hood, in which mounts the lenses are pivoted, and an adjusting device connected with both mounts, whereby the lenses are made to accord with the pupilary requirements of the eye, as set forth.

4. In a stereoscope or similar instrument, axially-pivoted lenses and an adjusting device common to both lenses, located between them and connected with their inner opposing portions, whereby to simultaneously adjust the lenses at an angle to their common axial line, or in a plane substantially parallel to the said line, and for retaining the lenses in adjusted position, as described.

5. In a stereoscope or similar instrument, lenses independently, axially and slidably mounted, an adjusting device common to both of the lenses, for imparting simultaneous axial movement thereto, and a second adjusting device independent of the first named and arranged to impart simultaneous sliding movement to the lenses, as described.

6. In a stereoscope or similar instrument, a hood, having openings in its rear section, frames mounted to slide in the openings, lenses pivoted in the frames, an adjusting device between the openings in the hood, link connections between the adjusting device and the inner edge portion of each lens, the said adjusting device being adapted for simultaneously changing the angularity or focal plane of the lenses, and a second adjusting device having right and left screw connection with both sliding frames, whereby to simultaneously laterally adjust the lenses to and from each other to accord with the pupilary requirements of the eye, as described.

7. In a stereoscope, a hood, a support extending rearwardly from the hood, stereoscopic view-lenses pivoted in the hood, carriers for the lenses slidably mounted in the hood, adjusting devices for the lenses and for their carriers, and a view-holder mounted upon said support, as described.

8. In a stereoscope, a hood, a support extending rearwardly from the hood, stereoscopic lens-views pivoted in the hood, carriers for the lenses slidably mounted in the hood, adjusting devices for the lenses and for their carriers, which devices act simultaneously yet independently on both lenses, and a view-holder mounted upon the support, as described.

9. In a stereoscope or similar instrument, a hood, frames mounted to slide in the hood, lenses pivoted in said frames, an axial adjusting device for the lenses, and an adjusting device for the frames in which the lenses are pivoted, one adjusting device operating in a plane at an angle to the other, substantially as described.

10. In a stereoscope or similar instrument, a hood, frames mounted to slide in the hood, lenses pivoted in said frames, an axial adjusting device for the lenses, an adjusting device for the frames in which the lenses are pivoted, one adjusting device operating in a plane at an angle to the other, and both of the adjusting devices operating at the forward portion of the hood, a support extending rearwardly from the hood, and a view-holder adjustable upon the support.

11. In a stereoscope, a hood, apertured partitions in the hood, frames mounted to slide between the partitions at their apertures, view-lenses pivotally mounted in said frames, a right and left hand screw adjusting device connected with the opposing portions of the frame, an adjusting-screw mounted to turn in the partitions between the lenses, a nut operated by the latter screw, and link connections between opposing edges of the lenses and corresponding portions of the nut, as specified.

12. In a stereoscope, a hood, apertured partitions in the hood, frames mounted to slide between the partitions at their apertures, stereoscopic view-lenses pivotally mounted in said frames, a right and left hand screw adjusting device connected with opposing portions of the frame, an adjusting-screw mounted to turn in the partition between the lenses, a nut operated by the latter screw, binding-frames for the lenses, independent of their carrying-frames, links pivotally connecting the lenses' binding-frames and the said nut, and means for operating each adjusting-screw independently, which means are located within the hood, as specified.

13. In a stereoscope or like instrument, a view-holder comprising two main sections adjustable to and from each other, a locking device for said sections, and view-carrying sections vertically adjustable upon the outer portions of the main sections, as set forth.

14. In a stereoscope or like instrument, a view-holder comprising two main sections having lateral adjustment to and from each other, a locking device for the said sections, auxiliary sections vertically adjustable upon the main sections, and means for frictionally controlling the position of the auxiliary sections relative to the main sections, said auxiliary sections having supports for a view, as described.

15. In a stereoscope or like instrument, a view-holder comprising laterally-adjustable main sections, a locking device for such sections, upright members at the outer terminals of the main sections, and vertically-adjustable sections between the upright members of the main sections, and view-receivers carried by the vertically-adjustable sections, which view-receivers are in frictional engagement with the terminal portions of the main sections, as described.

16. In stereoscopes and like instruments, a view-holder having upright opposing spaced terminal members, and slidable auxiliary sections mounted between the spaced upright terminal members, which auxiliary sections are provided with view-receiving pockets at their lower ends, having outwardly-flaring side walls adapted for frictional engagement with the upright terminal members of the main body of the view-holder, as set forth.

17. In stereoscopes, a view-holder constructed of laterally-adjustable sections, and independent view-carrying sections vertically adjustable upon the laterally-adjustable sections, as set forth.

In testimony whereof we have signed our names to this specification in the presence of two subscribing witnesses.

WILLIAM F. FOLMER.
ARTHUR M. LAWRENCE.

Witnesses:
F. M. HANAFORD,
EVERARD BOLTON MARSHALL.